UNITED STATES PATENT OFFICE.

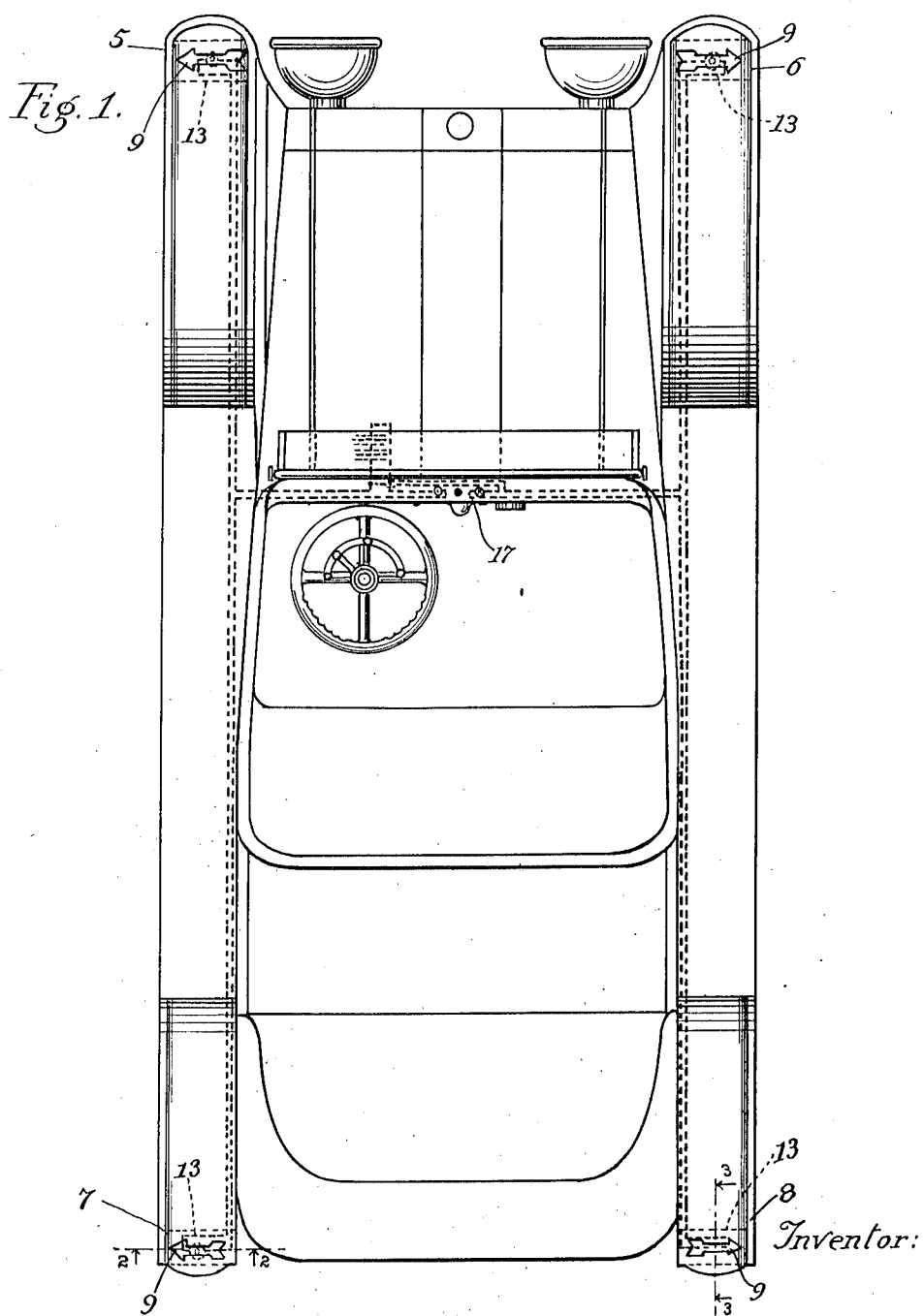

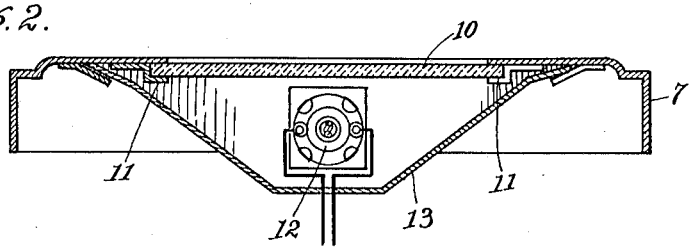
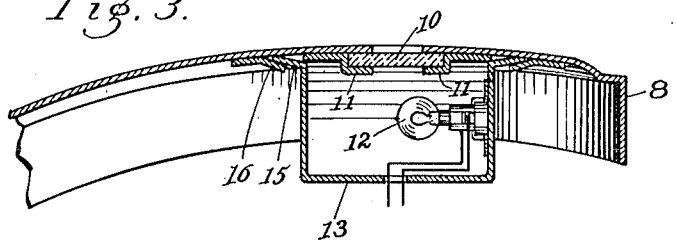
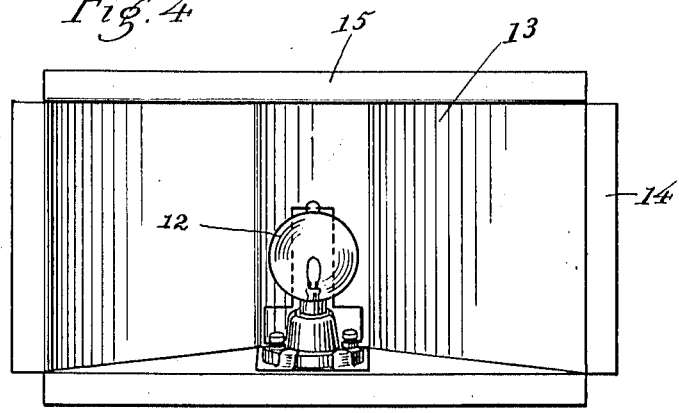

WILLIAM ADOLPH TAYC, OF CINCINNATI, OHIO.

DIRECTION-SIGNAL FOR AUTOMOBILES.

1,274,347.  Specification of Letters Patent.  Patented July 30, 1918.

Application filed March 9, 1918. Serial No. 221,457.

*To all whom it may concern:*

Be it known that I, WILLIAM ADOLPH TAYC, a citizen of the United States, residing in Cincinnati, in the county of Hamilton and State of Ohio, have invented new and useful Improvements in Direction-Signals for Automobiles, of which the following is a specification.

An object of my invention is to produce an improved direction signal for automobiles, in which the usual mechanism which is usually so easily disarranged and rendered inoperative, is eliminated.

A further object is to produce an improved direction signal for automobiles in which confusion as to the direction to be taken by the car equipped therewith, is rendered impossible.

These and other objects are attained in the direction signal described herein and illustrated in the drawing.

Figure 1 is a plan view of an automobile equipped with my improved direction signal.

Fig. 2 is a sectional view taken on the line 2—2 of Fig. 1.

Fig. 3 is a fragmental sectional view taken on the line 3—3 of Fig. 1.

Fig. 4 is a perspective view of the interior of the body portion of an element of my improved direction signal.

My improved direction signal consists of four elements 5, 6, 7 and 8, one of which is located at each corner of the automobile and is preferably mounted upon the mud guards thereof as will be hereinafter more fully described. I will use one of these elements in describing its construction and attachment to the mud guard. In the mud guard I stamp an opening 9 having the shape of an arrow, the head of the arrow pointing outwardly as indicated at each corner of the mud guards. Back of this arrow-shaped opening I have located a piece of glass 10, preferably of opalescent or other light diffusing glass. This piece of glass is held in position by means of clip 11. Back of each glass 10 I have located a lamp 12, preferably of the usual electric type and which is housed in a lamp body 13 of the shape shown in Figs. 2 to 4 inclusive, the body having outwardly projecting flanges 14 and 15 adapted to be engaged by clips 16 secured to the undersurface of each mud guard. The interior of the body may be burnished to provide the desired reflecting surface for projecting the light through the glass 10. Each lamp is connected by a suitable system of electric wiring to switches 17 mounted upon the instrument board of the vehicle in position accessible to the driver. I prefer to connect the lamps of signal elements 5 and 7 so that they are controlled from one switch, with the lamp of signal elements 6 and 8 controlled from the other switch. Thus vehicles and pedestrians to the front and rear of the moving vehicle are simultaneously warned as to the intended direction of travel of the vehicle.

Having thus described my invention what I claim is:—

1. In combination in an automobile, a mud guard having a direction indicating arrow-shaped opening stamped in the metal thereof, and means adapted to illuminate the opening.

2. In an automobile, mud guards having arrow-shaped openings therein, the points of said openings extending in different directions, means for illuminating the openings, and mechanism adapted to be operated by the driver to control said means, whereby the desired one of said openings may be illuminated.

3. In an automobile, the combination of a mud guard at each corner thereof having an arrow-shaped opening therein, the arrow openings on one side pointing away from the automobile and the arrow openings on the opposite side pointing in the opposite direction away from the automobile, light diffusing material located back of each opening, a casing located back of each opening, a lamp located within each casing, and means adapted to control the illumination of the lamps independently of each other.

In witness whereof, I affix my signature in the presence of two witnesses.

WILLIAM ADOLPH TAYC.

Witnesses:
C. M. BECHTEL,
WILLIAM JOHN SCHULTZ.